(12) United States Patent
Wu et al.

(10) Patent No.: US 10,626,053 B2
(45) Date of Patent: Apr. 21, 2020

(54) METHOD FOR RECOVERING VALUABLE METALS AND SIMULTANEOUSLY PREPARING CERAMSITE BY ROASTING CYANIDE TAILING

(71) Applicant: BEIJING UNIVERSITY OF TECHNOLOGY, Beijing (CN)

(72) Inventors: Yufeng Wu, Beijing (CN); Dean Pan, Beijing (CN); Xudong Sun, Beijing (CN); Tieyong Zuo, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 0 days.

(21) Appl. No.: 16/485,121

(22) PCT Filed: May 28, 2018

(86) PCT No.: PCT/CN2018/088702
§ 371 (c)(1),
(2) Date: Aug. 9, 2019

(87) PCT Pub. No.: WO2019/114198
PCT Pub. Date: Jun. 20, 2019

(65) Prior Publication Data
US 2019/0382312 A1    Dec. 19, 2019

(30) Foreign Application Priority Data
Dec. 13, 2017    (CN) .......................... 2017 1 1325294

(51) Int. Cl.
*C04B 33/32* (2006.01)
*C04B 33/138* (2006.01)
(Continued)

(52) U.S. Cl.
CPC ............ *C04B 33/138* (2013.01); *C04B 33/04* (2013.01); *C04B 33/131* (2013.01);
(Continued)

(58) Field of Classification Search
CPC ................ C04B 35/19; C04B 35/6261; C04B 35/62695; C04B 35/62204; C04B 33/04;
(Continued)

(56) References Cited

U.S. PATENT DOCUMENTS 4,963,185 A * 10/1990 Ellenbaum ................ C21B 5/02
                                                             75/319
5,830,251 A * 11/1998 Simpson ................. C03B 5/005
                                                            65/17.3

FOREIGN PATENT DOCUMENTS

| CN | 104164572 A | 11/2014 |
| CN | 104561528 A | 4/2015 |

(Continued)

OTHER PUBLICATIONS

GB/T 14685-2001, "Pebble and Crushed Stone for Construction" National Standard of the China, (Jun. 2011).
(Continued)

*Primary Examiner* — Noah S Wiese
(74) *Attorney, Agent, or Firm* — J.C. Patents

(57) ABSTRACT

A method for recovering valuable metals and simultaneously preparing ceramsite by roasting cyanide tailing belongs to the area of comprehensive recovery and high value utilization of metallurgical waste residue. In this method, cyanide tailings, bentonite, calcium chloride, coal powder and albite are mixed by ball milling according to certain weight ratio to get a mixture. After drying and roasting twice, dust is collected from the roasted ash, the obtained polymetallic ash is collected and treated. The secondary calcined material is cooled to obtain ceramsite. The invention volatilizes and recovers the valuable metal in the roasting and sintering process of cyanide tailings and directly prepares the ceramsite through reasonable batching, which achieves the effect of recycling cyanide tailings and high-value utilization, can (Continued)

create good economic and environmental benefits, and has significant effect of energy saving and consumption reduction.

2 Claims, 1 Drawing Sheet

(51) Int. Cl.
| | |
|---|---|
| C04B 33/04 | (2006.01) |
| C04B 33/13 | (2006.01) |
| C04B 35/19 | (2006.01) |
| C04B 35/622 | (2006.01) |
| C04B 35/626 | (2006.01) |
| C04B 35/64 | (2006.01) |
| C22B 1/02 | (2006.01) |
| C22B 7/04 | (2006.01) |
| C22B 11/00 | (2006.01) |

(52) U.S. Cl.
CPC .......... *C04B 33/1305* (2013.01); *C04B 33/32* (2013.01); *C04B 35/19* (2013.01); *C04B 35/6261* (2013.01); *C04B 35/62204* (2013.01); *C04B 35/62655* (2013.01); *C04B 35/62695* (2013.01); *C04B 35/64* (2013.01); *C22B 1/02* (2013.01); *C22B 7/04* (2013.01); *C22B 11/00* (2013.01); *C04B 2235/3208* (2013.01); *C04B 2235/349* (2013.01); *C04B 2235/3472* (2013.01); *C04B 2235/606* (2013.01); *C04B 2235/6567* (2013.01); *C04B 2235/661* (2013.01); *C04B 2235/9669* (2013.01)

(58) Field of Classification Search
CPC . C04B 33/131; C04B 33/32; C04B 2235/661; C04B 2235/606; C22B 7/04; C22B 1/16
See application file for complete search history.

(56) References Cited

FOREIGN PATENT DOCUMENTS

| | | |
|---|---|---|
| CN | 104726716 A | 6/2015 |
| CN | 107557570 A | 1/2018 |

OTHER PUBLICATIONS

Khodadad, A. et al., "Detoxification of Cyanide in a Gold Processing Plant Tailings Water Using Calcium and Sodium Hypochlorite" Mine Water and the Environment, Journal of the International Mine Water Association (IMWA), vol. 27, Issue 1, (2008), pp. 52-55.

Sun, Liugen et al., "The main technology status and development trend of harmless and resourceful utilization of cyanide tailings" China Resources Comprehensive Utilization, vol. 35, No. 10, (Oct. 2017), pp. 59-62, English Abstract is included.

The International Search Report of corresponding international application No. PCT/CN2018/088702, dated Aug. 1, 2018.

GB 5085.3-2007, "Identification standard for hazardous wastes—identification for extraction toxicity" National Standard of the China, (Apr. 2017).

GB/T 14685-2011, "Pebble and Crushed Stone for Construction" National Standard of the China, (Jun. 2011).

* cited by examiner

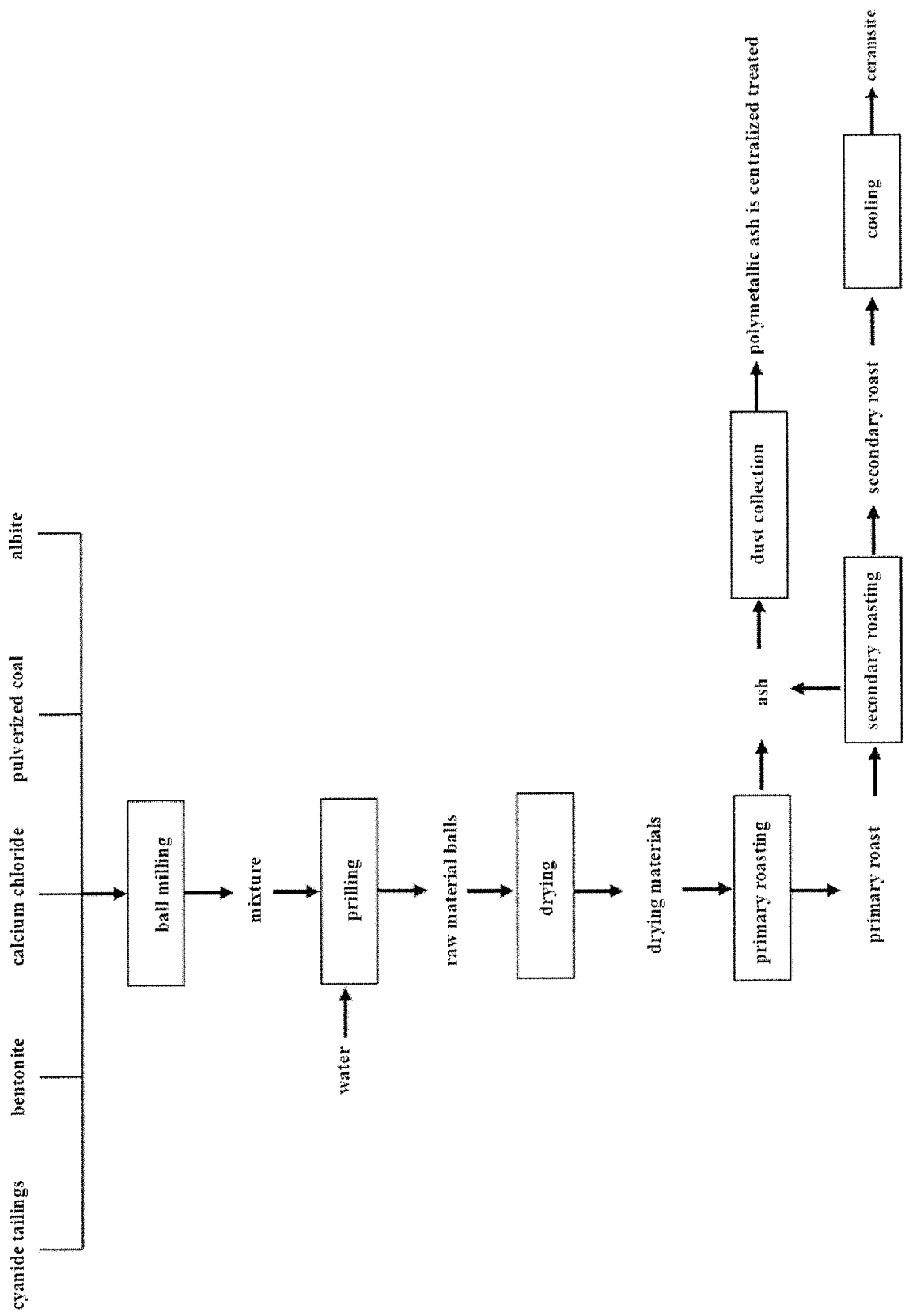

METHOD FOR RECOVERING VALUABLE METALS AND SIMULTANEOUSLY PREPARING CERAMSITE BY ROASTING CYANIDE TAILING

CROSS-REFERENCE TO RELATED APPLICATION

This application is a national phase application of international application No. PCT/CN2018/088702 filed on May 28, 2018, which in turn claims the priority benefits of Chinese application No. 201711325294.5, filed on Dec. 13, 2017. The contents of these prior applications are hereby incorporated by reference in their entirety.

TECHNICAL FIELD

The present disclosure relates to the field of metallurgical waste residue comprehensive recovery, especially relates to a method for recovery valuable metals and simultaneously preparing ceramsite by roasting cyanide tailing.

BACKGROUND ART

Cyanide gold extraction is an economical and simple method for extracting gold from ore, concentrate or tailings, It has a series of advantages such as high recovery rate and strong ore adaptability. Since it was put forward at the end of the 19th century, this method has been widely used in the world gold production and has become the main method of modern gold mine smelting. At present, 90% of the gold mines in the world use cyanide gold extraction, and more than 80% of the gold dressing plants in China use cyanide gold extraction. But its disadvantage is also obvious, the production process produced a large amount of cyanide tailings. Cyanide tailings are initially treated as waste and are traditionally disposed of either by stockpiling or landfill. This not only wastes a lot of land resources, but also exposes the sulfur and heavy metals in the cyanide tailings, such as gold, silver, copper, lead and zinc, as well as cyanide residues in the flotation process, to the air. When exposed to sunlight, rainwater can produce harmful gases and liquids, which can seep into the ground and cause serious pollution to water bodies and soil. In addition, cyanide tailings, which have been processed for many times, have fine particles, which are easy to cause dust in dry or windy weather, affect air quality, pollute atmospheric environment, and do great harm to the environment. It is estimated that the annual economic loss caused by cyanide residue waste pollution can reach hundreds of millions of yuan. The new national hazardous waste list, jointly issued by the ministry of environmental protection and the national development and reform commission and the ministry of public security, came into force on Aug. 1, 2016. The cyanide tailings produced in the process of gold dressing with cyanide are classified as hazardous waste, an environmental protection tax of 1,000 yuan/ton will be levied on hazardous waste, so the gold industry will suffer a devastating blow. Therefore, the recycling of cyanide tailings is not only necessary for the rational development of resources and environmental protection, but also for the improvement of economic benefits and self-development of the gold industry.

The reuse of tailings includes two aspects: First, recovery from the tailings extract useful components, that is, the reselection of tailings; second, use tailings as the basic raw materials to develop new products. At present, most studies on cyanide tailings have focused on how to further extract Au, Ag, Fe, S and other valuable elements in tailings more efficiently, but there is a lack of research on the disposal method of residual waste residue after treatment. The residual residue is also a very important secondary mineral resource and contains a large amount of non-metallic mineral materials, quartz, feldspar, pyroxene, garnet, amphibole and altered clay, mica and other aluminosilicate minerals and calcite, dolomite and calcium magnesium carbonate minerals which can be widely used in building materials, light industry, inorganic chemical industry and other fields.

In conclusion, it will become an important direction of development to prepare high-performance building materials with cyanide tailings as the main raw material. The non-metallic mineral composition in the cyanide tailings is the same as that required for the raw material of ceramsite and can be used as the main raw material for the production of ceramsite. Generally, high temperature sintering is adopted in the preparation of ceramsite. High temperature sintering combined with the method of chlorination roasting, the heavy metals are volatilized in the form of chloride and the ceramsite is fired simultaneously, the whole process is controlled in the same calcination equipment which reduce the process steps, energy consumption and pollution. The method of recovering valuable metals by roasting cyanide tailings to produce ceramsite can not only solve the environmental problems caused by waste residues, but also realize harmless value-added utilization of waste residues and create huge economic benefits. Therefore, the invention relates to a method for recovering valuable metals by roasting cyanide tailings and simultaneously preparing ceramsite has great significance and value.

SUMMARY

The invention relates to a method for recovering valuable metals and simultaneously preparing ceramsite by roasting cyanide tailing. The valuable metal in cyanide tailings is recovered by roasting, and the high-performance ceramsite is prepared simultaneously, so as to reduce environmental pollution and improve economic benefits, and achieve the effect of recycling hazardous wastes and safe disposal.

The specific technical steps of the method are as follows:

(1) ball milling: the mixture of cyanide tailings, bentonite, calcium chloride, pulverized coal and albite is obtained by ball milling with a weight ratio of 100:(5-10):(4-10):(1-7):(5-20);

(2) prilling: the mixture obtained in step (1) is fed into the disc granulator for granulation, and raw material balls with particle size of 2-5 cm are obtained;

(3) drying: the raw material balls obtained in step (2) are dried under 100-200° C. for 3-5 h to obtain a dried material;

(4) primary roasting: the dried materials obtained in step (3) are primary roasted, with the roasting temperature of 700-900° C. and the roasting time of 0.5-3 h to obtain primary calcined material and ash;

(5) secondary roasting: the primary calcined material obtained in step (4) is roasted at high temperature, the roasting temperature is 1050-1200° C., the roasting time is controlled at 0.5-3 h, secondary calcined material and ash is obtained;

(6) dust collection: the ash obtained in steps (4) and (5) is treated with dust collection, and the obtained polymetallic ash is centralized and treated;

(7) cooling: the secondary calcined material obtained in step (5) is cooled to obtain the ceramsite.

Further, steps (4), (5) and (7) are carried out in the same roasting equipment.

The content of heavy metals in the prepared ceramsite is much lower than «GB5085.3-2007», and its physical properties meet the requirements of «GB/T 14685-2011».

Compared with existing technologies, the invention combines the technology of chlorination volatilization and the preparation of ceramsite, which can not only effectively improve the volatilization efficiency of heavy metals in the cyanide tailings, but also can simultaneously produce ceramsite products. It not only reduces the pollution to the environment, but also creates economic value. The invention can recover valuable metals by volatilization in the roasting and sintering process of cyanide tailings with reasonable ingredients and simultaneously prepare ceramsite to achieve the effect of resource recovery and high-value utilization of cyanide tailings, which can create good economic and environmental benefits and has significant effect of energy saving and consumption reduction.

BRIEF DESCRIPTION OF THE APPENDED DRAWING

FIG. 1 shows the process flow chart of the method of recovery valuable metals and simultaneously preparing ceramsite by roasting cyanide tailing.

PREFERRED EMBODIMENTS

Embodiment 1

(1) ball milling: the mixture of cyanide tailings, bentonite, calcium chloride, pulverized coal and albite is obtained by ball milling with a weight ratio of 100:5:4:1:5;

(2) prilling: the mixture obtained in step (1) is fed into the disc granulator for granulation, and raw material balls with particle size of 2 cm are obtained;

(3) drying: the raw material balls obtained in step (2) are dried under 100° C. for 3 h to obtain a dried material;

(4) primary roasting: the dried materials obtained in step (3) are primary roasted, with the roasting temperature of 700° C. and the roasting time of 0.5 h to obtain primary calcined material and ash;

(5) secondary roasting: the primary calcined material obtained in step (4) is roasted at high temperature, the roasting temperature is 1050° C., the roasting time is controlled as 0.5 h, secondary calcined material and ash is obtained;

(6) dust collection: the ash obtained in steps (4) and (5) is treated with dust collection, and the obtained polymetallic ash is centralized and treated;

(7) cooling: the secondary calcined material obtained in step (5) is cooled to obtain ceramsite.

Through the method of this embodiment, the leaching content of several heavy metals in the finished ceramsite fired by cyanide tailings is: (mg/L): Ag:0.0015, Cu:0.043, Zn:0.0013, As:0.0014, Pb:0.0015, the content of Hg is lower than the detection limit; The physical properties of ceramsite are as follows: 1 h water absorption rate is 13%, bulk density is 1025 kg/m$^3$, and cylinder compression strength is 11.5 MPa.

Embodiment 2

(1) ball milling: the mixture of cyanide tailings, bentonite, calcium chloride, pulverized coal and albite is obtained by ball milling with a weight ratio of 100:10:10:7:20;

(2) rilling: the mixture obtained in step (1) is fed into the disc granulator for granulation, and raw material balls with particle size of 5 cm are obtained;

(3) drying: the raw material balls obtained in step (2) are dried under 200° C. for 5 h to obtain a dried material;

(4) primary roasting: the dried materials obtained in step (3) are primary roasted, with the roasting temperature of 900° C. and the roasting time of 3 h to obtain primary calcined material and ash;

(5) secondary roasting: the primary calcined material obtained in step (4) is roasted at high temperature, the roasting temperature is 1200° C., the roasting time is controlled as 3 h, secondary calcined material and ash is obtained;

(6) dust collection: the ash obtained in steps (4) and (5) is treated with dust collection, and the obtained polymetallic ash is centralized and treated;

(7) cooling: the secondary calcined material obtained in step (5) is cooled to obtain ceramsite.

Through the method of this embodiment, the leaching content of several heavy metals in the finished ceramsite fired by cyanide tailings is: (mg/L): Ag:0.001, Cu:0.041, Zn:0.0011, As:0.0012, Pb:0.0013, the content of Hg is lower than the detection limit; The physical properties of ceramsite are as follows: 1 h water absorption rate is 15%, bulk density is 1150 kg/m$^3$, and cylinder compression strength is 12.5 MPa.

Embodiment 3

(1) ball milling: the mixture of cyanide tailings, bentonite, calcium chloride, pulverized coal and albite is obtained by ball milling with a weight ratio of 100:7:5:3:10;

(2) rilling: the mixture obtained in step (1) is fed into the disc granulator for granulation, and raw material balls with particle size of 3 cm are obtained;

(3) drying: the raw material balls obtained in step (2) are dried under 150° C. for 4 h to obtain a dried material;

(4) primary roasting: the dried materials obtained in step (3) are primary roasted, with the roasting temperature of 800° C. and the roasting time of 1 h to obtain primary calcined material and ash;

(5) secondary roasting: the primary calcined material obtained in step (4) is roasted at high temperature, the roasting temperature is 1100° C., the roasting time is controlled as 1 h, secondary calcined material and ash is obtained;

(6) dust collection: the ash obtained in steps (4) and (5) is treated with dust collection,and the obtained polymetallic ash is centralized and treated;

(7) cooling: the secondary roast obtained in step (5) is cooled to obtain ceramsite.

Through the method of this embodiment, the leaching content of several heavy metals in the finished ceramsite fired by cyanide tailings is: (mg/L): Ag:0.001, Cu:0.047, Zn:0.001, As:0.0014, Pb:0.0017, the content of Hg is lower than the detection limit; The physical properties of ceramsite are as follows: 1 h water absorption rate is 12.4%, bulk density is 1035 kg/m$^3$, and cylinder compression strength is 11.7 MPa.

What is claimed is:

1. A method for recovering valuable metals and simultaneously preparing ceramsite by roasting cyanide tailing, comprising the following steps:
   (1) ball milling: a mixture of the cyanide tailing, bentonite, calcium chloride, pulverized coal and albite with a weight ratio of 100:(5-10):(4-10):(1-7):(5-20) is obtained via ball milling;
   (2) prilling: the mixture obtained in step (1) is fed into a disc granulator for granulation, and raw material balls with particle size of 2-5 cm are obtained;
   (3) drying: the raw material balls obtained in step (2) are dried at 100-200° C. for 3-5 hours to obtain dried raw material balls;

(4) primary roasting: the dried material balls obtained in step (3) are roasted at 700-900° C. for 0.5-3 hours to obtain primary calcined material and ash;
(5) secondary roasting: the primary calcined material obtain in step (4) is roasted at 1050-1200° C. for 0.5-3 hours, secondary calcined material and ash is obtained;
(6) dust collection: the ash obtained in steps (4) and (5) which contains polymetallic ash is collected and treated;
(7) cooling: the secondary calcined material obtained in step (5) is cooled to obtain the ceramsite.

2. The method for recovering valuable metals and simultaneously preparing ceramsite by roasting cyanide tailing according to claim 1, wherein steps (4), (5) and (7) are carried out in the same roasting equipment.

* * * * *